July 27, 1926.

W. M. TANNER 1,594,079

RESILIENT SUSPENSION MEANS FOR MOTOR CYCLES

Filed Jan. 27, 1926    2 Sheets-Sheet 1

INVENTOR
W. M. TANNER,
BY
ATTY.

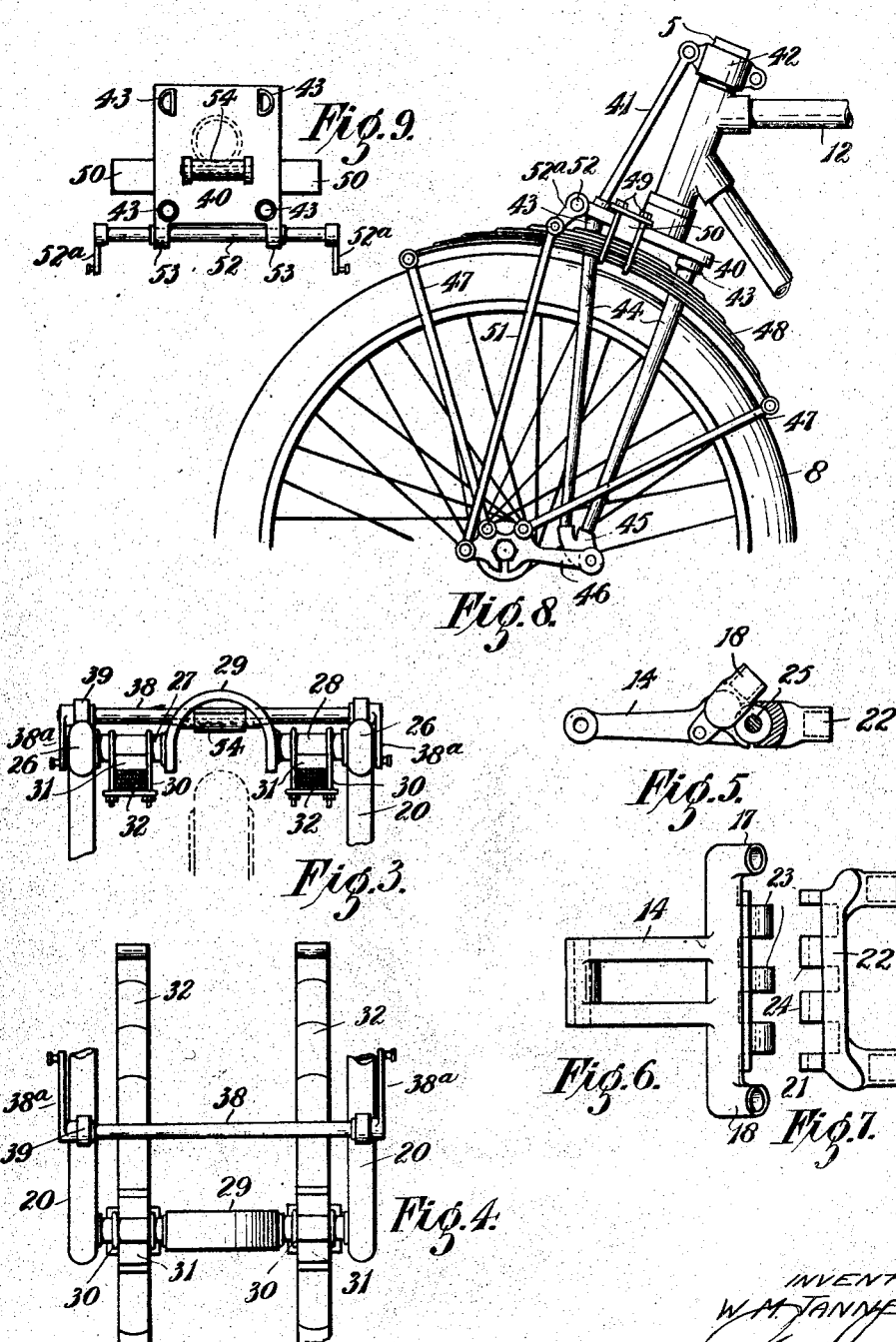

Patented July 27, 1926.

1,594,079

UNITED STATES PATENT OFFICE.

WILLIAM MOSTYN TANNER, OF WAGGA WAGGA, NEW SOUTH WALES, AUSTRALIA.

RESILIENT SUSPENSION MEANS FOR MOTOR CYCLES.

Application filed January 27, 1926, Serial No. 84,232, and in Australia January 28, 1925.

This invention relates to improved resilient suspension means for the wheels of motor-cycles and like vehicles.

One object of the invention is to provide improved suspension means for motorcycles wherein shocks imparted to a road wheel are evenly distributed between suspension springs arranged on opposite sides of said road wheel, thus resulting in satisfactory even absorption of the road shocks.

A further object is to provide improved spring suspension means for motor cycles whereby curb or rebound of the springs is reduced and side sway of the cycle is obviated, thus materially increasing riding comfort.

According to the invention, the road wheels of a motor cycle are carried by forks or arms which are pivotally connected to a rigid portion of the cycle frame, and semielliptic suspension springs, provided on opposite sides of each of the road wheels, are link connected at their ends to said pivoted forks or arms. The pivoted forks or arms are connected to crank-rods mounted on a rigid portion of the cycle frame, and these crank-rods function to equally distribute the road shocks between the oppositely arranged suspension springs.

Equalizing levers may be provided to curb rebound of the suspension springs and also to evenly distribute the road shocks between the opposite ends of the suspension springs of the rear wheel or both the rear and front wheels of the cycle.

Reference is now made to the accompanying drawings wherein:

Figure 3 is a cross-sectional view of the rear part of the cycle frame.

Figure 4 is a plan view of Figure 3.

Figure 5 is a detail view of a hinge joint provided in the rear part of the cycle frame.

Figures 6 and 7 are detail plan views of the elements of the hinge joint illustrated in Figure 5.

Figure 8 is an enlarged view of the forward part of the cycle frame showing the suspension means for the front road or steering wheel.

Figure 9 is a view of a detail shown in Figure 8.

Figure 1:
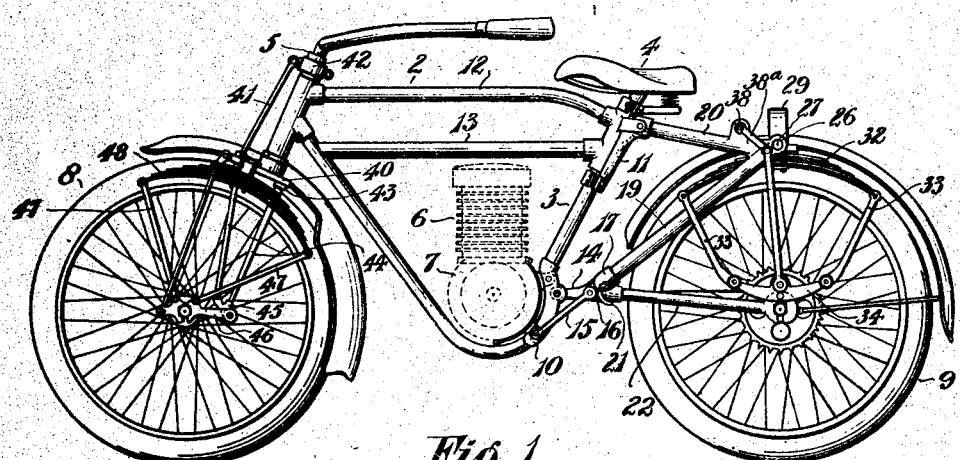
Figure 1 is a view in side elevation of a motor-cycle provided with the improved resilient suspension means.
Figure 2:
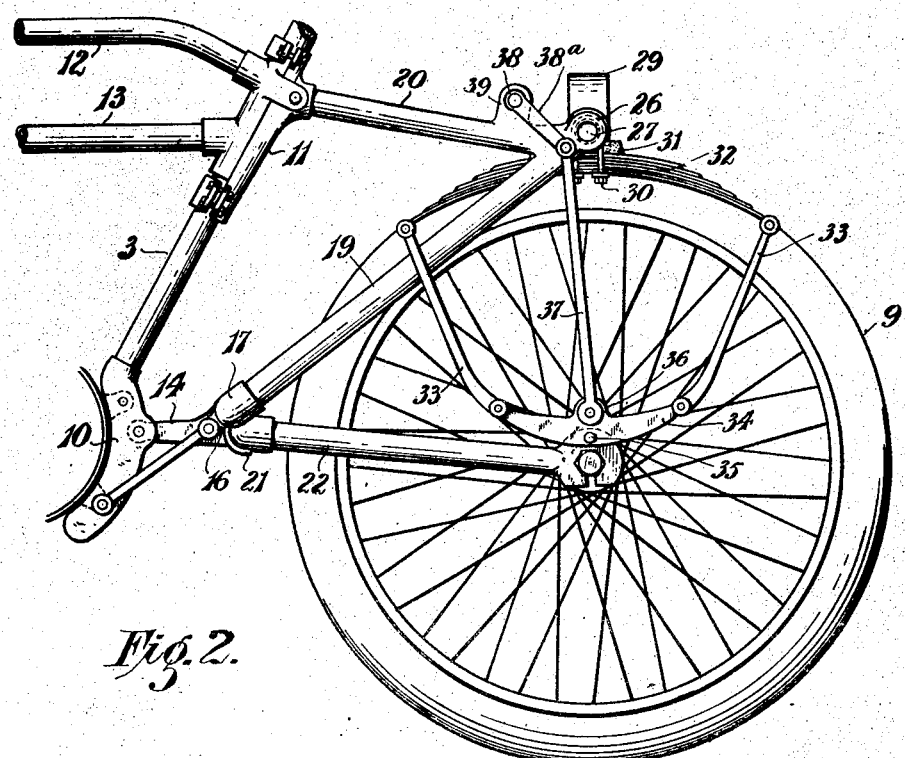
Figure 2 is an enlarged view of the rear portion of the cycle frame showing the suspension means for the rear road or driving wheel.

In these views 2 indicates the frame of a motor-cycle, 3 the saddle-pillar bar of the frame, 4 the riding saddle, 5 the steeringpillar bar of the frame, 6 the engine, 7 the engine crank-case, 8 the front road or steering wheel, and 9 the rear road or driving wheel of the cycle. Secured by bolts to the rear portion of the engine crank case 7 are cradle plates 10, to which the lower end of the saddle-pillar bar 3 is rigidly fastened. Fitted to the upper end of said saddle-pillar bar is a clamp 11 of two-part type, to which the main horizontal frame bars 12 and 13 are secured.

Connected to the cradle plates 10 on the engine crank-case is a rearwardly extending and approximately horizontal bar 14, which is rigidly stayed by an inclined staybar 15 secured to lugs 16 on said horizontal bar 14 and also to said cradle plates 10. Formed at the rear end of said horizontal bar 14 are bosses 17 and 18, in which are fitted two angular frame bars, arranged one on each side of the rear road or driving wheel 9. Each of said angular frame bars comprises an upwardly inclined member 19 and an integral horizontal member 20 which extends forwardly from the upper end of said inclined member and is secured at its forward end to said clamp 11 on the saddle pillar bar 3. The horizontal bar 14 and the two angular frame bars constitute a rigid part of the motor-cycle frame.

Pivotally connected to the rear end of the horizontal bar 14 by a hinge joint 21 is a fork 22 supporting the rear road wheel 9 of the cycle. The hinge joint 21, which is illustrated in detail in Figures 5, 6 and 7, is of the knuckle type, comprising two sets of interfitting lugs 23 and 24 formed respectively on the horizontal bar 14 and the wheel fork 22 and pivotally connected together by a hinge pin 25.

Fixedly mounted in bosses 26 formed at the apices of the two angular frame bars 19—20 is a bar 27 rigidly connecting said angular frame bars. This bar 27 is constructed having two lateral arms 28 of circular cross-section and a central arched member 29, which fits over the tire of the rear road wheel 9—see Figure 3. Clamped to said arms 28 of the transverse bar 27 by U-bolts 30 and bearer blocks 31 are suspension springs 32 preferably of the semi-elliptic type. These suspension springs are positioned one on each side of the rear road wheel 9 and each is pivotally attached at its opposite ends by links 33 to the ends of oscillating levers 34. These levers 34, which are provided to equalize shocks between the ends of the springs 32, are arranged on opposite sides of the wheel and they are pivoted to the wheel fork 22 by pivot pins 35 arranged directly above the wheel centre.

Pivotally connected to a lug 36 formed at the central portion of each equalizing lever 34 is an approximately vertical connecting link 37, which is pivotally attached at its upper end to a crank 38$^a$ on a rod 38, which is common to both of said links 37 and is rotatably mounted in lugs 39 formed on the horizontal members 20 of said angular frame bars.

When a road shock is imparted to the rear cycle wheel 9, the rear wheel fork 22 moves upwardly, in which action it pivots from the hinge joint 21, and the cycle wheel rises into the central arched member 29 of the transverse bar 27. The shock imparted to the cycle road wheel is transmitted by the links 33 to the opposite ends of the suspension springs 32 and causes said springs to be straightened, thus absorbing the shock. Simultaneously, the vertical links 37 rotate the crank-rod 38 and cause the shock to be distributed evenly, at opposite side of the road wheel. By means of said crank-rod and its link connections, all road shocks imparted to the rear cycle wheel are equally distributed between the suspension springs 32 on opposite sides of the wheel and an even absorption of the shocks with increased riding comfort is ensured.

During the movement of the wheel 9 occasioned by road shocks, the oscillating levers 34 automatically adjust themselves on their pivot pins 35 and cause the shocks to be applied equally to the opposite ends of the suspension springs 32, whereby rebound of said springs is curbed.

The spring suspension for the front road wheel of the motor-cycle comprises a flat plate 40, which is secured to the lower end of the steering column 5. This plate is suitably stayed by an inclined stay-bar 41 connected at its upper end to a clamp 42 fitted around said steering column. Fitted in bosses 43 formed on the underneath surface of said flat plate 40 are fork members 44, which are arranged two on each side of the front road wheel 8.

The fork members on each side of the road wheel are rigidly connected together at their lower extremities by brackets 45 which pivotally support horizontal arms 46. These arms carry the front road wheel 8 and each has pivoted links 47 which are connected at their upper ends to the opposite extremities of suspension springs 48 of semi-elliptic type. These suspension springs 48 are secured by U-bolts 49 to square shaped lugs 50, which are formed laterally on the flat plate 40—see Figure 9.

Pivotally connected to each of the wheel supporting arms 46 is a link 51, which is connected at its upper end to a crank 52$^a$ on the rod 52, which is common to both of said links 51 and is revolvably mounted in apertured lugs 53 formed at the forward end of said flat plate 40.

When a road shock is imparted to the forward wheel 8, the horizontal arms 46 move upwardly by pivoting from their brackets 45, and the links 47 transmit the shock to the ends of the suspension springs 48, causing said springs to be straightened and the shock to be absorbed. As the road wheel moves upwardly the links 51 simultaneously rotate the crank-rod 52 and cause the shock to be equally distributed on opposite sides of the road wheel for absorption equally by the oppositely arranged suspension springs 48.

Small rollers such as 54 (see Figures 3 and 9) are revolvably mounted on the underneath surface of the arched member 29 of the transverse bar 27 and on the underneath surface of the flat plate 40 to provide antifriction means for the road wheels 9 and 8 should same be caused to rise by road shocks to such an extent that otherwise they would contact with frame members of the cycle.

What I do claim is:—

1. Improved resilient suspension means for cycles comprising, pivoted arms supporting the road wheels, semi-elliptic suspension springs arranged on opposite sides of said wheels, link connections between said pivoted supporting arms and the opposite ends of said suspension springs, and crank-rods rotatable on the cycle frame and connected on opposite sides of the road wheels to said pivoted supporting arms whereby shocks imparted to the road wheels are evenly distributed to the oppositely arranged suspension springs and are absorbed thereby.

2. Improved resilient suspension means for cycles as claimed in claim 1, and wherein oscillating shock-equalizing levers are pivoted to the wheel supporting arms, and the semi-elliptic suspension springs are connected at their opposite ends to said equalizing levers.

3. Improved resilient suspension means for a road wheel of a cycle comprising, a pivoted fork supporting the road wheel, rigid frame bars arranged on opposite sides of said road wheel, a transverse bar connecting said frame bars, semi-elliptic suspension springs arranged on opposite sides of the wheel and secured to said transverse bar, link connections between the pivoted fork and the opposite ends of said suspension springs, a crank-rod rotatably mounted on said frame bars, and connections on each side of the road wheel between the pivoted fork and said crank-rod.

4. Improved resilient suspension means for a road wheel of a cycle as claimed in claim 3, and wherein the frame bars are connected to a horizontal bar that is carried by the cycle frame, and the wheel supporting fork is pivoted to said horizontal bar.

5. Improved resilient suspension means for a road wheel of a cycle as claimed in claim 3, and wherein the transverse bar is formed having an arched member to fit over the tire of the wheel, and an anti-friction roller is mounted on said arched member.

6. Improved resilient suspension means for the front road wheel of a cycle comprising, a plate secured to the steering column, forks carried by said plate, horizontal arms pivoted to said forks and supporting the front road wheel, semi-elliptic suspension springs carried by said plate, link connections between the wheel supporting arms and the opposite ends of said suspension springs, a crank-rod rotatable on said plate, and connections on both sides of the wheel between the wheel supporting arms and said crank-rod.

In testimony whereof I affix my signature.

WILLIAM MOSTYN TANNER.